G. F. J. Colburn.
Comb.
Nº 45909.    Patented Jan. 17. 1865
Fig: 1.
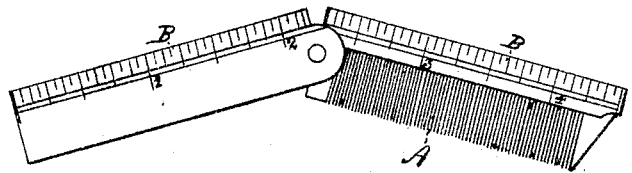
Fig: 2.
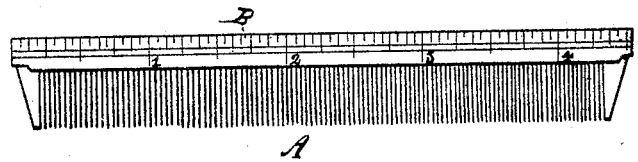
Witnesses
C. D. Smith
J. Scheitlin
Inventor
G F J Colburn
By Munn & Co
Attorneys

UNITED STATES PATENT OFFICE.

G. F. J. COLBURN, OF NEWARK, NEW JERSEY.

IMPROVEMENT IN COMBS.

Specification forming part of Letters Patent No. 45,909, dated January 17, 1865.

*To all whom it may concern:*

Be it known that I, G. F. J. COLBURN, of Newark, in the county of Essex and State of New Jersey, have invented a new and useful Combined Comb and Rule; and I do hereby declare the following to be a full and exact description of the same, reference being had to the accompanying drawings, making part of this specification, in which—

Figure 1 is a side view of a two-part hinged comb with my invention applied. Fig. 2 is a similar view of a comb formed in one piece.

Similar letters of reference indicate corresponding parts in the two figures.

This invention consists in graduating a comb so as to combine a convenient pocket-rule with the comb.

In the accompanying drawings, A represents a comb of any suitable form, which, as represented by the two figures, may be formed either in two sections so as to be adapted to fo'd and be conveniently carried about in the pocket, or in one piece, as may be deemed advisable by the user.

Upon the frame of the comb is a graduated scale, B, which may be produced by cutting, marking, printing, or otherwise. The rule itself may be of a certain desired length and the graduations and figures on the comb indicative of relative distance.

Various modifications relative to the method of graduating the comb are contemplated; and I wish it distinctly understood that I do not limit myself to any particular kind of comb or way of making the same serve the purpose of a rule.

Having thus described invention, what I claim as new, and desire to secure by Letters Patent, is—

A comb having graduations or a rule arranged therewith, substantially as described.

Witnesses:   G. F. J. COLBURN.
 CHARLES D. SMITH,
 OCTAVIUS KNIGHT.